United States Patent
Verbridge (10) Patent No.: US 11,261,956 B2
(45) Date of Patent: Mar. 1, 2022

(54) GEARBOX HAVING INTERNAL COOLING PINS

(71) Applicant: Rivian IP Holdings, LLC, Plymouth, MI (US)

(72) Inventor: Mason Verbridge, Canton, MI (US)

(73) Assignee: Rivian IP Holdings, LLC, Irvine, CA (US)

(*) Notice: Subject to any disclaimer, the term of this patent is extended or adjusted under 35 U.S.C. 154(b) by 0 days.

(21) Appl. No.: 16/919,360

(22) Filed: Jul. 2, 2020

(65) Prior Publication Data
US 2022/0003308 A1 Jan. 6, 2022

(51) Int. Cl.
*F16H 57/04* (2010.01)

(52) U.S. Cl.
CPC ......... *F16H 57/04* (2013.01); *F16H 57/0415* (2013.01); *F16H 57/0471* (2013.01)

(58) Field of Classification Search
CPC ...... F16H 57/02; F16H 57/04; F16H 57/0409; F16H 57/0413; F16H 57/0415; F16H 57/0417; F16H 57/0423; F16H 57/0424; F16H 57/0457; F16H 57/0471
See application file for complete search history.

(56) References Cited

U.S. PATENT DOCUMENTS

| | | | | |
|---|---|---|---|---|
| 2,511,479 A | * | 6/1950 | Olah | F16H 1/16 184/11.1 |
| 3,817,354 A | * | 6/1974 | Meiners | F01M 11/0004 184/104.3 |
| 9,975,415 B2 | | 5/2018 | Jansen et al. | |
| 10,247,296 B2 | * | 4/2019 | van der Merwe | F16H 57/02 |
| 10,619,852 B2 | * | 4/2020 | Porter | B22C 7/02 |
| 2009/0145581 A1 | * | 6/2009 | Hoffman | H01L 23/473 165/80.3 |

(Continued)

FOREIGN PATENT DOCUMENTS

| | | | | |
|---|---|---|---|---|
| DE | 102004022863 A1 | * | 12/2005 | ......... F16H 57/0498 |
| EP | 0990820 A2 | * | 4/2000 | ......... F16H 57/0415 |
| JP | 2002005270 A | * | 1/2002 | ......... F16H 57/0415 |

(Continued)

OTHER PUBLICATIONS

Machine translation of EP 0990820 A2 obtained on Oct. 2, 2020.*

(Continued)

*Primary Examiner* — Adam D Rogers
(74) *Attorney, Agent, or Firm* — Haley Guiliano LLP (57) ABSTRACT

A drivetrain system includes a housing configured to at least partially contain a liquid lubricant such as oil that flows through a gearset. Within the housing is arranged a plurality of bearings configured to constrain respective trajectories of respective shafts. An inner surface of the housing includes a first region surrounding a motor gear bearing that is actively cooled by a coolant. The inner surface also includes a second region that is distal to the motor gear bearing and that is not actively cooled by the coolant. Cooling pins are arranged in the first region and are configured to provide heat transfer from the liquid lubricant to the coolant. The gear set can include more than one shaft, with at least one gear configured to splash oil onto the cooling pins to transfer heat from the liquid lubricant to a coolant flowing in a motor housing adjacent the first region.

20 Claims, 5 Drawing Sheets

(56) References Cited

U.S. PATENT DOCUMENTS

2016/0223183 A1* 8/2016 Zou ...................... F21V 29/773

FOREIGN PATENT DOCUMENTS

| JP | 2009168145 A | * | 7/2009 | ......... F16H 57/0415 |
| WO | WO-9104427 A1 | * | 4/1991 | ......... F16H 57/0415 |
| WO | WO-2007124885 A2 | * | 11/2007 | ......... F16H 57/0417 |

OTHER PUBLICATIONS

Tesla Model S Rear Drive (A screenshot from a video available at, for example, https://youtu.be/wvLmBfwmA04).
Model S Rear Drive Unit (A screenshot from a video available at, for example, https://youtu.be/wvLmBfwmA04).

* cited by examiner

FIG. 6

GEARBOX HAVING INTERNAL COOLING PINS

INTRODUCTION

The present disclosure is directed towards gearbox cooling, and more particularly, towards gearbox housings having internal cooling pins.

SUMMARY

The present disclosure is directed to a housing for a drivetrain system that is configured to at least partially contain a liquid lubricant. The housing includes a plurality of bearings, an inner surface, and a plurality of cooling pins. The plurality of bearings, which include a motor gear bearing, are configured to constrain respective trajectories of respective shafts. A first region of the inner surface is actively cooled by a coolant. A second region of the inner surface is distal to the motor gear bearing and is not actively cooled by the coolant. The plurality of cooling pins are arranged in the first region and configured to provide heat transfer from the liquid lubricant to the coolant.

In some embodiments, each cooling fin of the plurality of cooling fins has a cylindrical shape extending from the first region substantially normal to the inner surface. In some embodiments, each cooling pin of the plurality of cooling pins includes a cylindrical portion extending from the first region substantially normal to the inner surface, and a rounded end portion. In some embodiments, each cooling pin of the plurality of cooling pins has a respective length, and a first cooling pin and a second cooling pin of the plurality of cooling pins have different lengths. In some embodiments, the plurality of cooling pins each include a respective shape and respective spacing to increase transfer of heat at the first region to the coolant as compared to a configuration without the plurality of cooling pins. In some embodiments, the housing includes one or more recesses arranged in the first region to provide increased cooling to the coolant from the liquid lubricant as compared to a configuration without the one or more recesses.

In some embodiments, a plurality of gears are coupled to the plurality of bearings. The plurality of gears are configured to cause the liquid lubricant to flow against at least some of the plurality of cooling pins. In some embodiments, the plurality of gears are affixed to the respective shafts, and are configured to cause the liquid lubricant to flow turbulently around the plurality of cooling pins.

In some embodiments, the first region is actively cooled by coolant that flows through a motor jacket in a coolant passage that passes near an outer surface of the housing corresponding to the first region. In some embodiments, an outer surface of the housing corresponding to the first region forms a portion (e.g., one or more turnarounds) of the coolant passage. In some embodiments, the second region includes a lower region configured as a basin for the liquid lubricant, and at least one gear coupled to a shaft of the respective shafts is configured to rotate through a bulk portion of the liquid lubricant in the basin.

In some embodiments, the present disclosure is directed to a drivetrain system that includes a plurality of bearings, a plurality of gears, and a housing that includes a plurality of cooling pins. The plurality of cooling pins arranged in a first region of the housing and configured to provide heat transfer from the liquid lubricant to a coolant.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

Heat due to friction and windage in a gearbox (e.g., of an electric vehicle drivetrain) can limit the capability of continuous output and the power capacity of the gearbox. For example, heat generation may reduce the efficiency of the gearbox and increase component wear over time. Further, components that heat up may expand beyond built-in tolerances and cause seizing in the gearbox, preventing or restricting motion (e.g., of gears, bearings, shafts). While one approach is to add a heat exchanger to the system, or otherwise affect coolant flow (e.g., both of which add cost and complexity), another additional or alternative approach is to design the geometry of the interior of the gearbox housing to address heat transfer.

Figure 1:
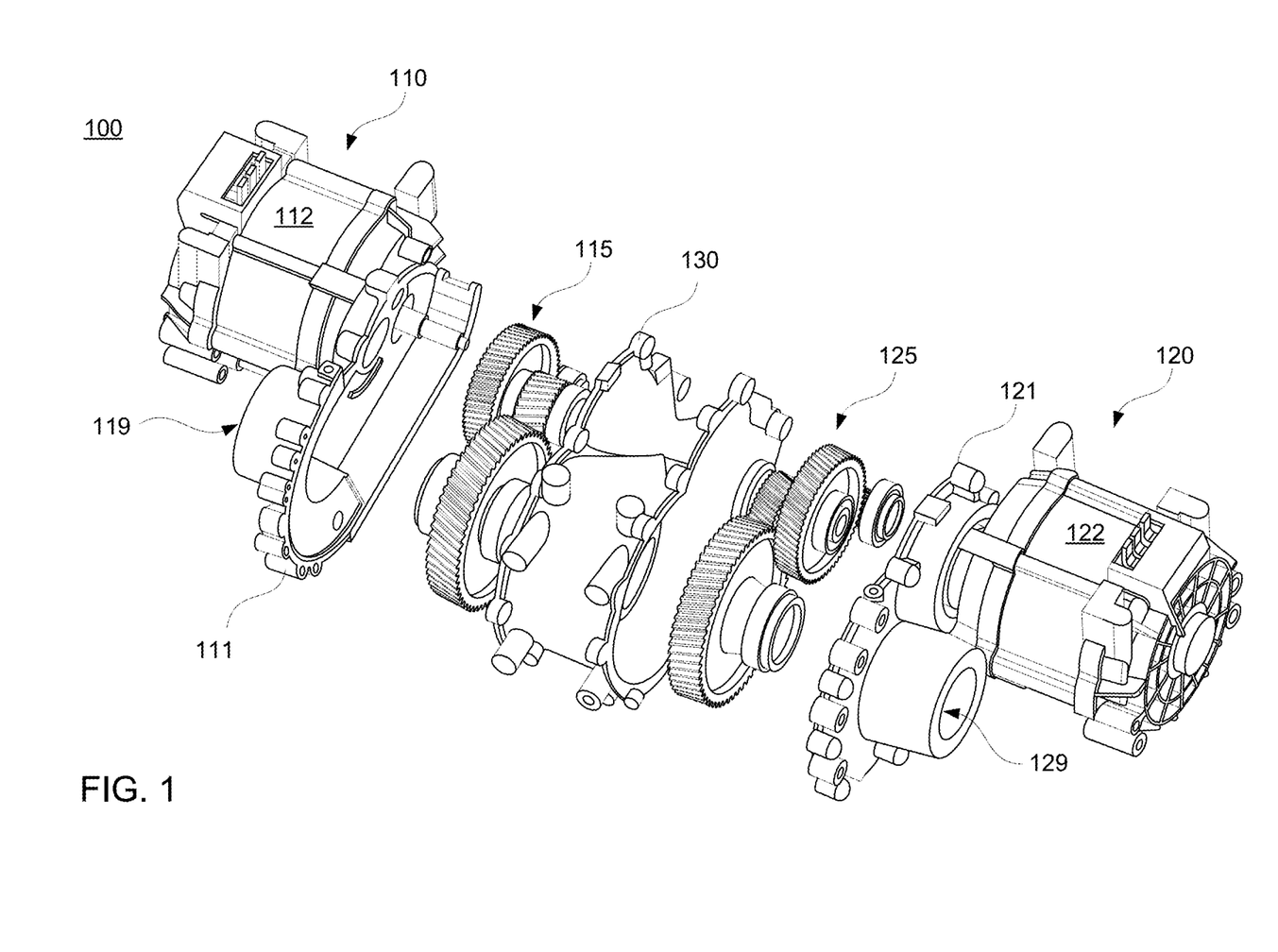
FIG. 1 shows an exploded perspective view of an illustrative drivetrain system, in accordance with some embodiments of the present disclosure.

FIG. 1 shows an exploded perspective view of illustrative drivetrain system 100, in accordance with some embodiments of the present disclosure. Drivetrain system 100, as illustrated, includes assembly 110, assembly 120, and intermediate housing 130 configured to couple assemblies 110 and 120 together. Assembly 110, as illustrated, includes motor 112, gearset 115, and housing 111. Assembly 120, as illustrated, includes motor 122, gearset 125, and housing 121. As illustrated, each of gearsets 115 and 125 includes a motor gear, an intermediate gearset (e.g., an intermediate gear and a wheel gear), and a drive gear (e.g., coupled to respective outputs 119 and 129).

A liquid lubricant (e.g., oil) is used within drivetrain system 100 to lubricate gearsets 115 and 125 (e.g., gears and bearings thereof), and is contained by housing 111, housing 121, and intermediate housing 130. For example, interfaces between housings may include a sealant, a gasket, an O-ring, a crush seal, any other suitable seal, or any combination thereof. In some embodiments, the liquid lubricant may pool or collect due to gravity near a bottom of the gearbox, where an oil pickup may be arranged to direct the bulk lubricant to a pump. The liquid lubricant is used to reduce friction losses between mating surfaces undergoing motion such as, for example, between enmeshed gear teeth, within bearings (e.g., roller bearings, tapered roller bearings, ball bearings, or any other suitable bearings), as well as provide cooling to components of drivetrain system 100. In some embodiments, the liquid lubricant provides convective cooling to surfaces. For example, in some embodiments, a liquid lubricant is pumped in a cooling circuit and accordingly external cooling can be provided (e.g., a liquid to air heat exchanger). To illustrate, the flowing liquid lubricant facilitates heat transfer from components of the drivetrain system, and the environment or other suitable heat sink. In some embodiments, housings 110 and 120, intermediate housing 130, housings of motors 112 and 122, or a combination thereof may include coolant passages for allowing a liquid coolant to flow (e.g., separate from the liquid lubricant). The liquid coolant further helps remove heat from the drivetrain system to the environment or heat sink, but does not provide a lubricating function to the moving parts of the drivetrain system.

In an illustrative example, each of assemblies 110 and 120 integrates a gearbox cover into the motor A-shield (also known as the motor end cap casting, and referred to here as housings 111 and 121). On the motor side of housing (e.g., which may include a casting), coolant flows through to cool the motor. By introducing geometry (e.g., pin fins or similar structures) to increase the surface area on the interior of the gearbox, higher heat rejection may be realized between the gearbox oil and the motor coolant. To illustrate, a cooling effect can be achieved inside the housing without a separate heat exchanger, which may require additional parts, pumps, or cooling channels.

Figure 2:
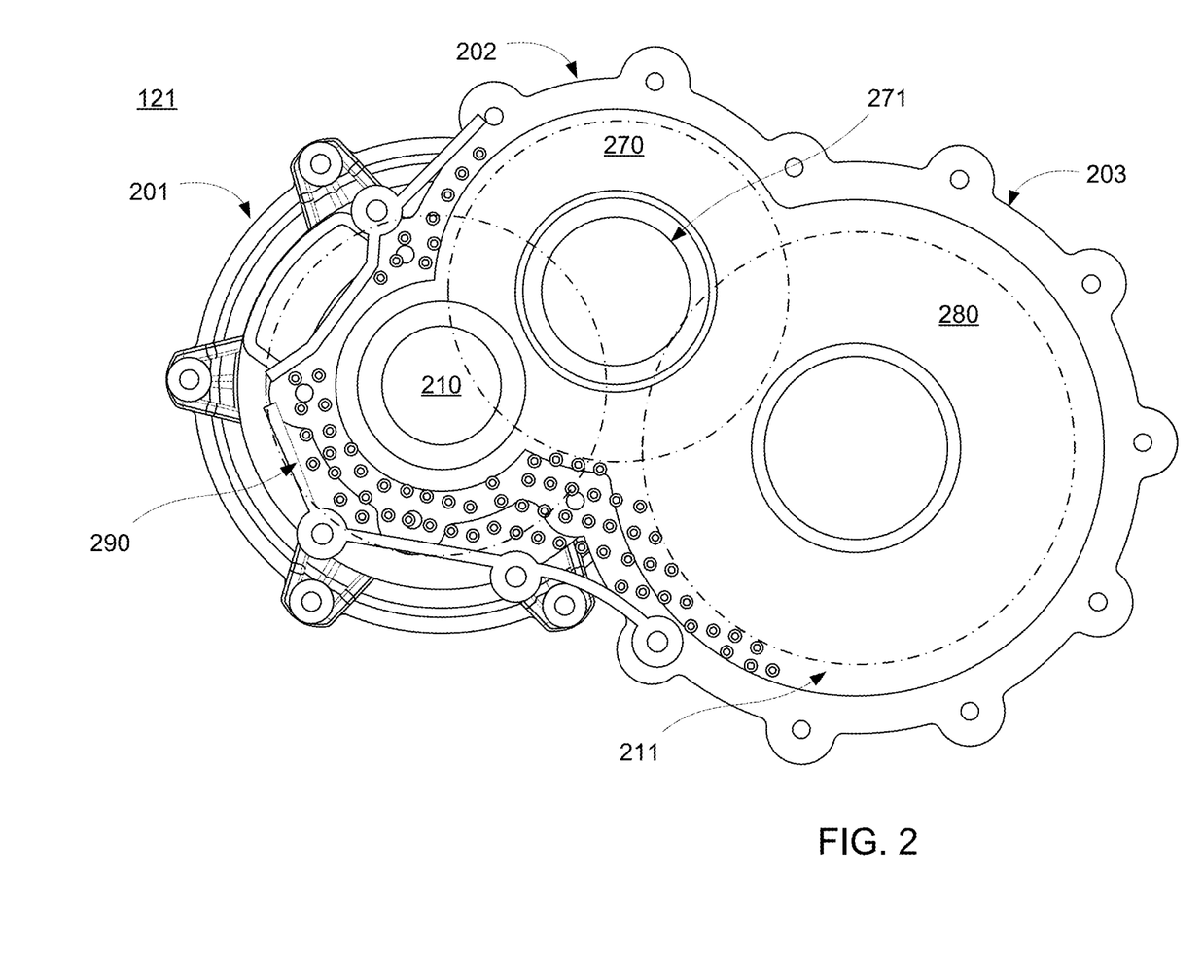
FIG. 2 shows a side view of a housing of the illustrative drivetrain system of FIG. 1, in accordance with some embodiments of the present disclosure.

FIG. 2 shows a side view of housing 121 (the interior side) of the illustrative drivetrain system of FIG. 1, in accordance with some embodiments of the present disclosure. Housing 121 includes three sections 201, 202, and 203 corresponding to the three gear shafts. For example, each of sections 201, 202, and 203 are substantially circular, and overlap thus forming a footprint indicative of gearset 125. To illustrate, sections 201, 202, and 203 represent partial circular sections that overlap. Regions 210, 270, and 203 correspond to circular regions on the interior of housing 121 that approximately correspond to sections 201, 202, and 203, respectively.

As illustrated, region 210 includes cooling pins 290 and is arranged overlapping section 201, where housing 121 abuts the corresponding motor (e.g., motor 122 of FIG. 1, as illustrated). Region 210 may also overlap sections 202 and 203 to any suitable extent, as illustrated. Region 270 is arranged overlapping region 210, and includes a portion of housing 121 surrounding a bearing of an intermediate shaft of gearset 125, and region 270 may be at least partially cooled by coolant provided to the motor housing. In some embodiments, the intermediate shaft rotates at a rotational speed less than that of a motor gear shaft, due to gear reduction. In some such embodiments, a drive shaft (e.g., arranged with an axis in region 280, with drive gear bearings) may be engaged with the intermediate shaft via meshing gears (e.g., a drive gear and an intermediate gear), and rotates at a rotational speed less than that of the intermediate shaft due to gear reduction. To illustrate, because the motor shaft may rotate at a relatively greater rotational speed than the intermediate shaft or drive shaft, bearings coupled to the motor shaft may generate more heat. The motor bearings are also more directly cooled by the coolant in the motor housing, and accordingly, the motor shaft bearings do not necessarily achieve the greatest temperate (e.g., the intermediate shaft bearings may achieve a greater temperature due to reduced cooling from the coolant in the motor housing).

In some embodiments, cooling pins 290 are each shaped as a round pin extending into the interior of housing 121 from region 210, thus increasing the inner surface area of the gearbox and increasing conductive heat transfer out of the gear box. Cooling pins 290 may include any suitable cross-sectional shape and may include any suitable length, in accordance with the present disclosure. For example, cooling pins may have a flat, triangular, rectangular, polygonal, lobed, curved, or circular cross-section, any other suitable cross-section, or any combination thereof (e.g., a composite cross-section, or a cross-section that varies along the length). Cooling pins 290 may be the same length, different lengths, the same cross-sectional shape, or a different cross-sectional shape.

Cooling pins 290 are distributed across at least some of region 210, and some region outside of region 210 (as illustrated), that contacts the motor housing (e.g., section 201 abuts the motor housing). In some embodiments, coolant is provided to the motor housing to cool the motor, and the coolant also receives additional heat transmitted from the attached gearbox (e.g., via housing 121). Cooling pins 290 allow for more conduction through housing 121 (as compared to a housing without cooling pins). In some embodiments, the increased heat transfer provided by cooling pins 290 allows cooling of the gearbox to be limited or controlled by the temperature and quantity of coolant flowing through the motor cooling loop (e.g., which may be externally controlled). In some embodiments, cooling pins 290 are arranged such that gears spinning through a basin of oil (e.g., in region 211, as illustrated) splash the oil turbulently over cooling pins 290, thus increasing heat flow (e.g., via convective heat transfer). In some embodiments, lubricant that has transferred heat to cooling pins trickles down through the collection of cooling pins 290 back to the basin (e.g., region 211) due to gravitational force. To illustrate, a drive gear may sweep through region 211, and any accumulated lubricant there, during rotation and cause the lubricant to flow over cooling pins 290. In some embodiments, the plurality of cooling pins are sized and arranged such that a convective boundary layer around each cooling pin is smaller than a spacing between the cooling fin and an adjacent cooling pin.

In an illustrative example, cooling pins 290 may maximize or otherwise increase conductive heat transfer while minimizing casting challenges such as minimum feature size. In some embodiments, housing 121 is cast and cooling pins 290 are cast features of housing 121. In some embodiments, cooling pins 290 may be affixed to housing 121 after casting (e.g., brazed, welded, pressed, threaded to, or otherwise secured to housing 121).

In a further illustrative example, inclusion of cooling pins 290 allows the use of an existing coolant system to increase cooling without adding additional coolant lines, pumps, or associated infrastructure. In some embodiments, housing 121 may be included in a gearbox with an existing coolant system to allow the existing coolant system to remove more heat from the gearbox. Region 210, as illustrated, is arranged to provides increased heat transfer to the motor coolant.

In a further illustrative example, by increasing conductive heat transfer out of the gearbox by using cooling pins 290, the gearbox can remain sealed during normal operation without the need for additional coolant lines, thus reducing the likelihood of foreign particle contamination of the gearbox. In some embodiments, a separate oil cooler is not required, and the plumbing associated with a separate oil cooler is avoided.

In a further illustrative example, passively cooling the gearbox using cooling pins 290 increases the lifetime of inner components of the gearbox (e.g., bearings, seals, gears, shafts) and decreases the likelihood of seizing moving components of the gearbox. To illustrate, reduced temperatures of components of the gearbox may improves gearbox durability.

In a further illustrative example, the use of cooling pins 290 may enable a gearbox to transmit increased power with increased efficiency, thus expanding the potential use cases of the gearbox.

Figure 3:
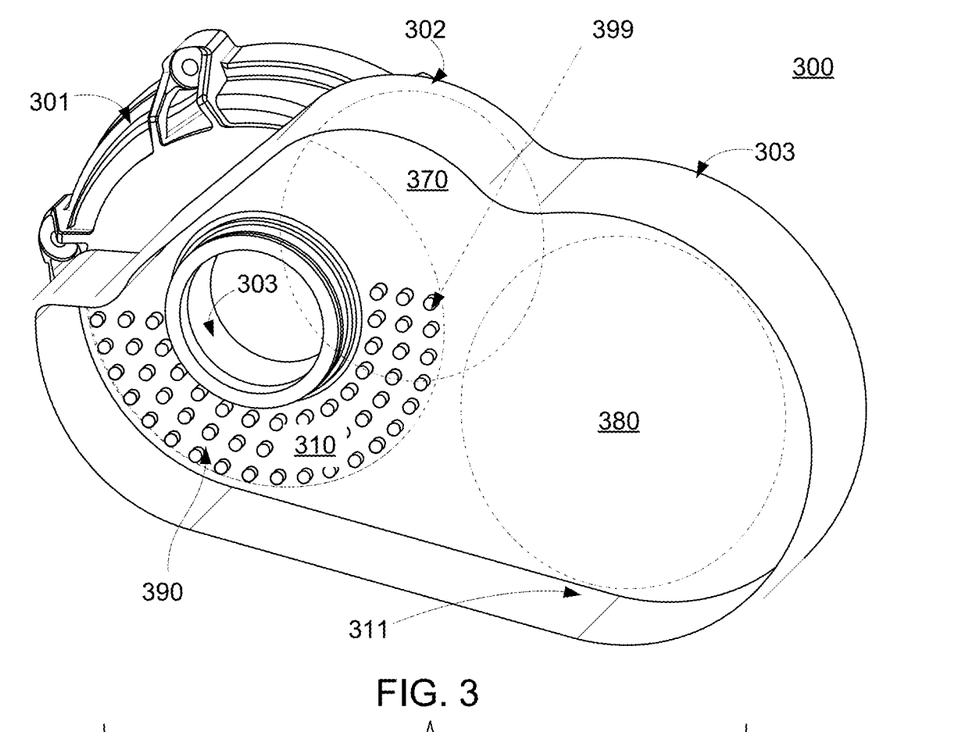
FIG. 3 shows a side perspective view of an illustrative housing for a gearbox having an array of cooling pins, in accordance with some embodiments of the present disclosure.
Figure 4:
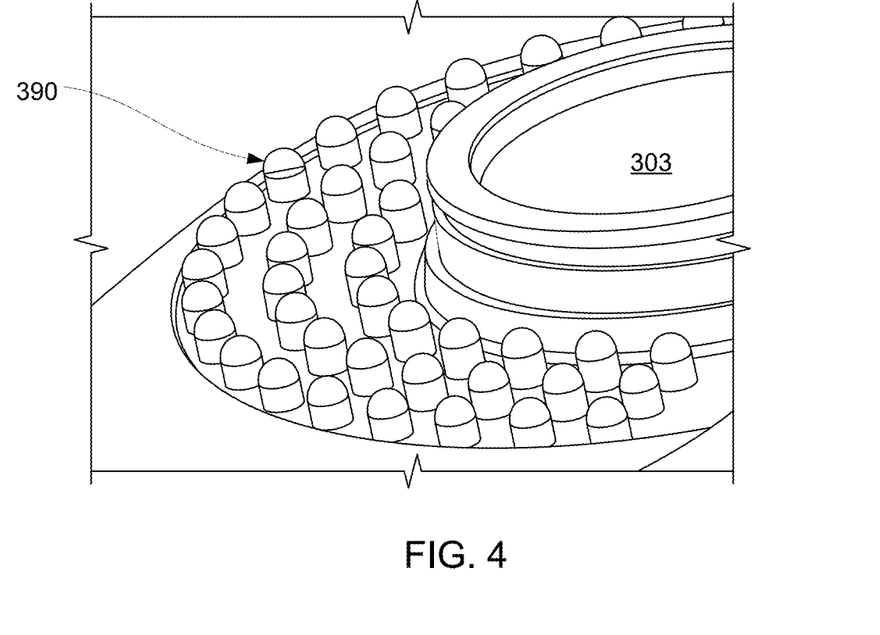
FIG. 4 shows an enlarged perspective view of the housing of FIG. 3, further illustrating the array of cooling pins, in accordance with some embodiments of the present disclosure.

FIG. 3 shows a side perspective view of illustrative housing 300 for a gearbox having an array of cooling pins 390, in accordance with some embodiments of the present disclosure. FIG. 4 shows an enlarged perspective view of housing 300 of FIG. 3, further illustrating array of cooling pins 390, in accordance with some embodiments of the present disclosure. For example, the enlarged view of FIG. 4 is illustrated from the direction of axis 399 of FIG. 3.

As illustrated, housing 300 includes sections 301, 302, and 303 similar to housing 121 of FIGS. 1-2. Housing 300 includes interface 303 for interfacing to a motor housing and accommodating a motor gear, motor gear shaft, and motor shaft bearing. Region 310 corresponds to an actively cooled region of housing 300, and includes cooling pins 390, which are arranged in an array as illustrated. Region 370 corresponds to a region of housing 300 adjacent to and partially overlapping the actively cooled portion of housing 300. Region 380 corresponds to a region of housing 300 that is not actively cooled and corresponds to portion of the gearbox surrounding a drive gear, drive shaft, and drive bearings. Region 311 corresponds to a basin wherein lubricant may accumulate due to gravitational forces (e.g., region 311 corresponds to the bottom of the gearbox when oriented for operation). Cooling pins 390 are configured and arranged to provide increased cooling from the lubricant to housing 300, and thus to the coolant system cooling the motor housing adjacent to section 301 (not shown). To illustrate, as a drive gear arranged in region 380 rotates, it causes liquid lubricant in region 311 to flow into and around cooling pins 390, thus causing convective heat transfer to cooling pins 390.

Figure 5:
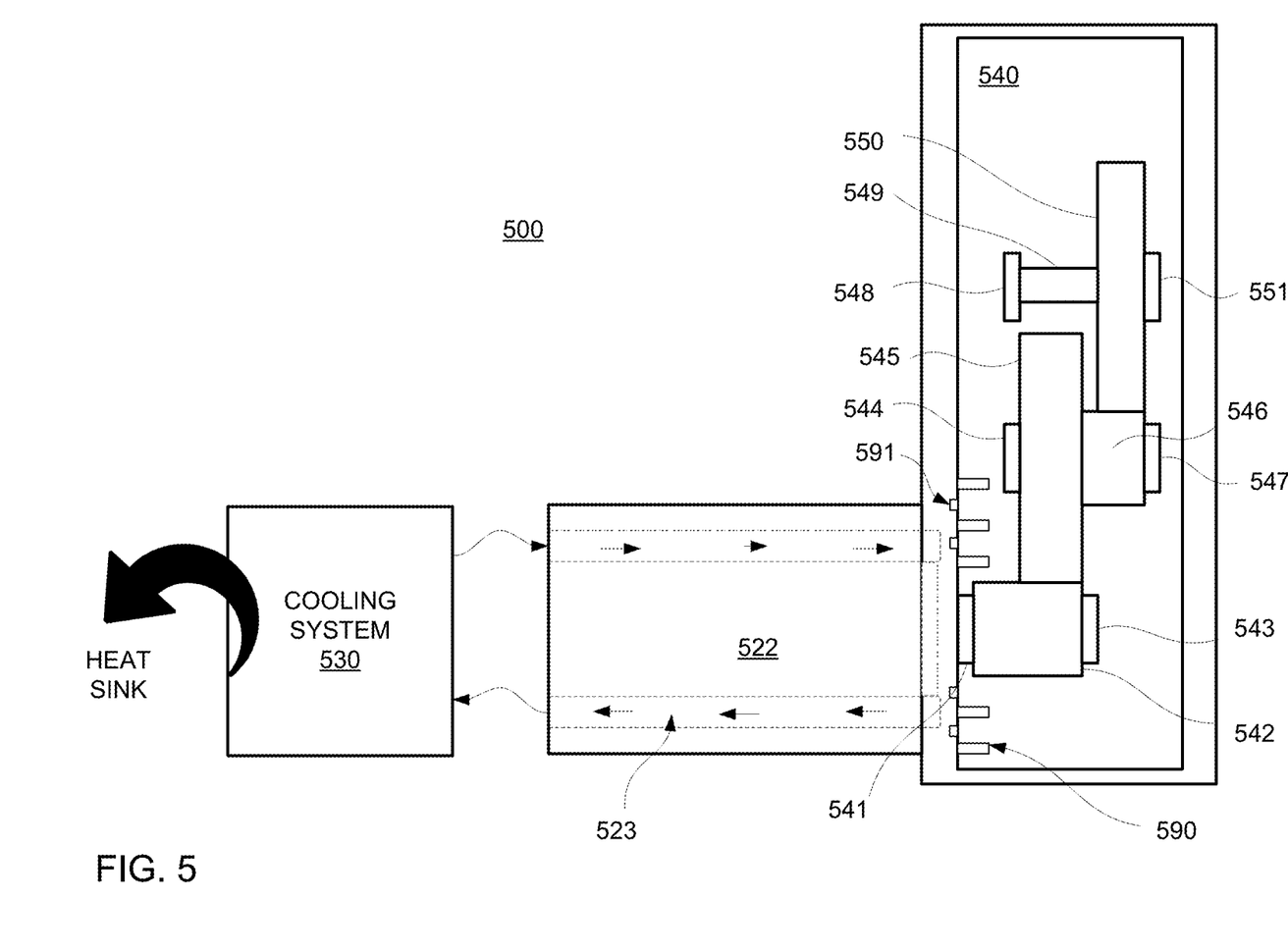
FIG. 5 shows a system diagram of an illustrative cooling system for a housing of a drivetrain system, in accordance with some embodiments of the present disclosure.

FIG. 5 shows a system diagram of illustrative cooling system 500 for housing 540 of a drivetrain system, in accordance with some embodiments of the present disclosure. System 500 includes cooling system 530, motor 522, a gearset (e.g., including gears 542, 545, 546, and 550), and bearings (e.g., bearings 541, 543, 544, 547, 548, and 551), arranged in housing 540. Housing 540 includes cooling pins 590 and recesses 591 arranged around motor bearing 541 and near cooling jacket 523 of motor 522. In some embodiments, a housing includes one or more recesses (e.g., recesses 591) to improve heat transfer along with cooling pins 590. As illustrated, cooling jacket 523 extends into housing 540. For example, a housing of motor 522 may include passages for coolant, and housing 540 may include one or more turnarounds or plenums to direct coolant back into the motor housing. Further, the interface between the housing of motor 522 and housing 540 may include one or more seals such as, for example, an O-ring, gasket, or any other suitable seal.

As illustrated, cooling system 530 is coupled to cooling jacket 523 of motor 522, and is configured to provide coolant to remove heat from motor 522. Heat generated in the gearbox, from gears and bearings, may be transferred by lubricant flow and conduction from the interior of housing 540 to cooling pins 590 to cooling jacket 523. Cooling system 530 may include a coolant reservoir, a pump, a filter, a pressure regulator, a flow meter, a flow control valve, any other suitable components, or any combination thereof. For example, cooling system 530 may include a pump head affixed to a motor, and may be configured for control based on flow rate, pressure, temperature, or a combination thereof. To illustrate, cooling system 530 may include a centrifugal pump wherein more coolant may be pumped by increasing the rotation speed of the pump (e.g., via an electric motor). If the primary restriction to heat transfer from the lubricant is at the interior of housing 540, the heat transfer will not be as strongly dependent on the operating characteristics of cooling system 530. This weaker dependence may lead to limited ability to control heat transfer using cooling system 530. The inclusion of cooling pins 590 relatively improves the heat transfer at the interior of housing 540, thus allowing the heat transfer to be more dependent on operating characteristics of cooling system 530. For example, by including cooling pins 530, changes in operating characteristics of cooling system 530 such pump speed, pump pressure, or both may provide for larger effects in heat transfer from housing 540.

As illustrated, motor gear 542 engages wheel gear 545, which is coupled to rotate with intermediate gear 546. Intermediate gear 546 engages drive gear 550 affixed to shaft 549. Bearings 541 and 543 are configured to maintain alignment of motor gear 542. Bearings 544 and 547 are configured to maintain alignment of wheel gear 545 and intermediate gear 546, or an intermediate shaft affixed thereto. Bearings 548 and 551 are configured to maintain alignment of drive gear shaft 549, and thus drive gear 550 affixed thereto. As illustrated, motor gear 542 rotates faster than intermediate gear 546, which in turn rotates faster than drive gear 550.

Figure 6:
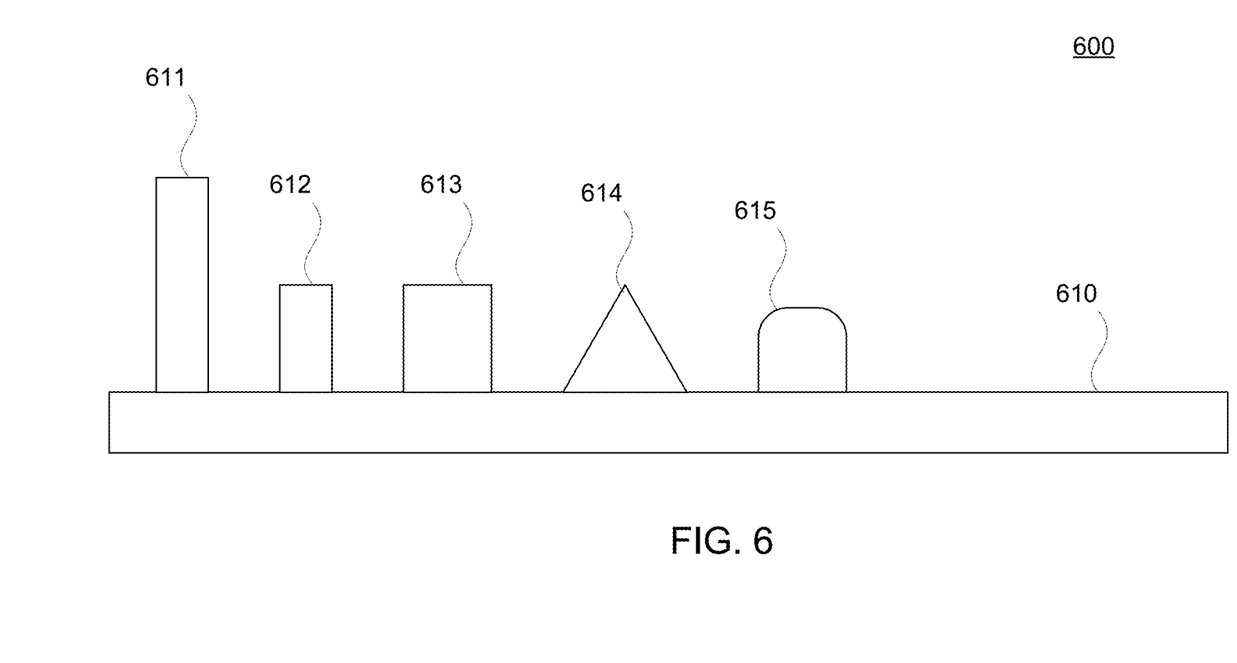
FIG. 6 shows illustrative cooling pins, in accordance with some embodiments of the present disclosure.

FIG. 6 shows illustrative cooling pins, in accordance with some embodiments of the present disclosure. Cooling system 600 includes housing 610, pin 611, 612, 613, 614, and 615. Pin 611 may include a circular cross-section, polygonal cross-section, any other suitable cross-section, or any combination thereof that is constant along the length. Pin 612 has a different length than pin 611 (e.g., pin 612 is shorter than pin 611). In some embodiments, one or more pins may have a length that differs from other pins. For example, a plurality of cooling pins may include two or more sets of pins, each set of pins having a length that may differ from another set of pins. Pin 613 has a different cross-sectional size from pin 611 (e.g., pin 613 has a larger cross-sectional area than pin 611). In some embodiments, one or more pins may have a cross-sectional area that differs from other pins. For example, a plurality of cooling pins may include two or more sets of pins, each set of pins having a cross-sectional area that may differ from another set of pins. Pin 614 has a tapered profile that may include a pyramidal or conical taper, which may be normal or oblique. In some embodiments, one or more sets of pins may have a varying cross-sectional area. For example, a plurality of cooling pins may include two or more sets of pins, one or more sets of pins having a varying cross-sectional area. Pin 615 has a rounded end. In some embodiments, one or more pins may have a rounded or tapered end. For example, a plurality of cooling pins may include two or more sets of pins, and one or more sets of pins may have a rounded or tapered end.

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A housing for a drivetrain system, wherein the housing is configured to at least partially contain a liquid lubricant, the housing comprising:
   a plurality of bearings configured to constrain respective trajectories of respective shafts, wherein the plurality of bearings comprise a motor gear bearing configured to constrain a motor shaft of a motor, wherein the motor comprises a motor housing affixed to the housing,
   wherein:
      the motor housing is affixed to the housing defining an outer boundary of a first external region of the housing,
      a first internal region of the housing opposes the first external region and surrounds the motor gear bearing,
      the outer boundary of the first external region overlaps the entirety of the first internal region,
      the first internal region is actively cooled by a coolant of the motor housing, and
   a plurality of cooling pins arranged in the first internal region and configured to provide heat transfer from the liquid lubricant to the coolant.

2. The housing of claim 1, wherein each cooling pin of the plurality of cooling pins comprises a cylindrical shape extending from the first internal region substantially normal to an inner surface of the first internal region.

3. The housing of claim 1, wherein each cooling pin of the plurality of cooling pins comprises:
   a cylindrical portion extending from the first internal region substantially normal to an inner surface of the first internal region; and
   a rounded end portion.

4. The housing of claim 1, wherein each cooling pin of the plurality of cooling pins comprises a respective length, and wherein a first cooling pin and a second cooling pin of the plurality of cooling pins have different lengths.

5. The housing of claim 1, further comprising one or more recesses arranged in the first internal region to provide increased cooling to the coolant from the liquid lubricant as compared to a configuration without the one or more recesses.

6. The housing of claim 1, wherein a plurality of gears are coupled to the plurality of bearings, and wherein the plurality of gears are configured to cause the liquid lubricant to flow against at least some of the plurality of cooling pins.

7. The housing of claim 6, wherein the plurality of gears are affixed to the respective shafts, and wherein the plurality of gears are configured to cause the liquid lubricant to flow turbulently around the plurality of cooling pins.

8. The housing of claim 1, wherein the plurality of cooling pins each comprise respective shapes and respective spacings to increase transfer of heat at the first internal region to the coolant as compared to a configuration without the plurality of cooling pins.

9. The housing of claim 1, wherein the coolant of the motor housing flows through a motor jacket in a coolant passage and wherein the first external region of the housing forms a portion of the coolant passage.

10. The housing of claim 1, further comprising a lower internal region configured as a basin for the liquid lubricant, wherein at least one gear coupled to a shaft of the respective shafts is configured to rotate through the basin.

11. A drivetrain system comprising:
   a gearbox housing configured to at least partially contain a liquid lubricant;
   a plurality of bearings configured to constrain respective trajectories of respective shafts, wherein the plurality of bearings comprise a motor gear bearing configured to constrain a motor shaft of a motor, wherein the motor comprises a motor housing affixed to the gearbox housing;
   a plurality of gears each affixed to one of the respective shafts,
   wherein:
      the motor housing is affixed to the gearbox housing defining an outer boundary of a first external region of the gearbox housing,
      a first internal region of the gearbox housing opposes the first external region and surrounds the motor gear bearing,
      the outer boundary of the first external region overlaps the entirety of the first internal region, and
      the first internal region is actively cooled by a coolant of the motor housing; and
   a plurality of cooling pins arranged in the first internal region and configured to provide heat transfer from the liquid lubricant to the coolant.

12. The drivetrain system of claim 11, wherein each cooling pin of the plurality of cooling pins comprises a cylindrical shape extending from the first internal region substantially normal to an inner surface of the first internal region.

13. The drivetrain system of claim 11, wherein each cooling pin of the plurality of cooling pins comprises:
   a cylindrical portion extending from the first internal region substantially normal to an inner surface of the first internal region; and
   a rounded end portion.

14. The drivetrain system of claim 11, wherein each cooling pin of the plurality of cooling pins comprises a respective length, and wherein a first cooling pin and a second cooling pin of the plurality of cooling pins have different lengths.

15. The drivetrain system of claim 11, wherein the gearbox housing further comprises one or more recesses arranged in the first internal region to provide increased cooling to the coolant from the liquid lubricant as compared to a configuration without the one or more recesses.

16. The drivetrain system of claim 11, wherein the plurality of gears are configured to cause the liquid lubricant to flow against at least some of the plurality of cooling pins.

17. The drivetrain system of claim 16, wherein the plurality of gears are configured to cause the liquid lubricant to flow turbulently.

18. The drivetrain system of claim 11, wherein the plurality of cooling pins each comprise respective shapes and respective spacings to increase conduction of heat at the first internal region to the coolant as compared to a configuration without the plurality of cooling pins.

19. The drivetrain system of claim 11, wherein the coolant of the motor housing flows through a motor jacket in a coolant passage and wherein the first external region of the gearbox housing forms a portion of the coolant passage.

20. The drivetrain system of claim 11, wherein the gearbox housing comprises a lower internal region configured as a basin for the liquid lubricant, wherein at least one gear coupled to a shaft of the respective shafts is configured to rotate through the basin.

\* \* \* \* \*